Patented Mar. 14, 1933

1,901,052

UNITED STATES PATENT OFFICE

MANVEL C. DAILEY, OF MAYWOOD, ILLINOIS, ASSIGNOR TO UNITED STATES GYPSUM COMPANY, OF CHICAGO, ILLINOIS, A CORPORATION OF ILLINOIS

COMPOSITION FOR MOLDING INVESTMENT INLAYS

No Drawing. Application filed July 3, 1930, Serial No. 465,646. Renewed July 30, 1932.

This invention relates to compositions of matter, and has reference more particularly to compositions especially suitable for the molding of such articles as dental investment inlays.

In the preparation of gold inlays, crowns, etc., wax models of the size and shape to be replaced by gold are first prepared, invested or cast, in what is known as inlay investment plaster. After setting, this investment plaster is subjected to a high temperature of from 800° to 1500° F. for a sufficient length of time to completely calcine the plaster and burn out all traces of wax. The metal flask holding the investment is then placed in the gold casting machine, and molten gold is forced under pressure into the cavity left by the wax. After cooling, the plaster is scraped away and the gold casting is ready for use after being finished and polished.

In order that castings of this sort may be true to dimension, it is important that the thermal expansion of the inlay investment composition used in their preparation be sufficiently high to counteract the shrinkage of the gold from its melting point to mouth temperature. Certain inlay investment compositions now on the market are comprised essentially of a mixture of about 70 per cent finely ground silica with 30 per cent plaster of Paris. Small amounts of various additive materials such as boric acid, graphite, or retarder are sometimes added, either to improve the thermal expansion characteristics of the material, its surface character, or to regulate the time of set. Other than having a high thermal expansion, the ideal investment composition should be smooth and plastic after setting, so that the surface of the gold casting will also be smooth.

An object of this invention therefore is to provide an inlay investment composition having a high thermal expansion so that gold castings can be made which are true to size.

Another object of the invention is to provide an inlay investment composition which will impart a smooth surface to gold castings made therefrom; also to improve compositions of matter in other respects hereinafter specified and claimed.

In the co-pending application of Randel and Dailey, Serial No. 384,343, filed August 9, 1929, and entitled, "High strength calcined gypsum," a new high strength calcined gypsum is described together with its method of manufacture. This high strength calcined gypsum has unique properties in that its compressive and tensile strength equal or exceed that of Portland cement, whereas its setting time is approximately that of ordinary plaster of Paris, viz., 15 to 30 minutes. The compressive strength of this product will range from 3500 to 6000 pounds per sq. in., and it has a pouring consistency of less than 50%. Normal or pouring consistency is defined as that amount of water in cubic centimeters or grams, which, when mixed with 100 grams of dry stucco, will produce a mix of such consistency that it will just pour from a cup. This consistency figure is the same as percentage water based on weight of stucco.

This high strength calcined gypsum, which I shall in the future designate as "alpha gypsum," is manufactured by treating lumps of gypsum rock having a diameter of ½" to 2" in a closed container with steam at 17 to 20 pounds gauge pressure. Steam at 15 to 50 pounds gauge pressure may be used, but outside of the preferred range of 15–20 pounds gauge, the strength and quality of the resulting product diminishes. This steam calcination is carried on for 4½ to 7 hours with a constant steam pressure, and with a constant withdrawal of water of condensation obtained from the heating steam, and also from the expelled water of crystallization. The calcined gypsum is then dried while maintaining its temperature close to 212° F., and ground so that 85% or more will pass a 100 mesh screen.

Calcined gypsum as seen under crossed nicols in a petrographic microscope, appear as very fine and needle-like. The crystals of alpha gypsum as viewed at the same magnification under the same microscope appear rather short, thick, and well formed. The crystals of alpha gypsum are practically pure crystalline calcium sulphate hemihydrate, and under this microscope, they appear brilliantly colored, while little or no color is visible in the case of the tiny, needle-like crystals of ordinary plaster of Paris.

I have now found that by substituting alpha gypsum after a further ball mill grinding, in the older formula instead of the ordinary plaster of Paris which is commonly used in the preparation of these investment compositions, the thermal expansion of the improved composition is materially increased. An ordinary plaster of Paris-silica investment composition will have a thermal expansion at 650° C. of about 0.6 to 0.7%. The alpha gypsum-silica compound, using similar proportions, will have a thermal expansion ranging from 0.8 to 0.9 per cent. This is a very decided advantage as has been heretofore explained. Another advantage accruing from the use of the alpha gypsum over that of ordinary plaster of Paris, is its great strength. While great strength is not particularly essential in an investment composition, the material should be sufficiently strong after calcination to withstand the pressure of the molten gold as it is forced into the mold.

I find it preferable but not essential to add certain plasticizing agents to my improved composition. A straight alpha gypsum-silica composition, produces gold castings which are slightly rough as to surface character. I have found that by the admixture of about five parts of finely ground plasticizing agent, such as andalusite or rotten stone to 100 parts of the alpha gypsum-silica mix, castings of a fine, smooth, and glossy surface may be obtained. The plasticizing agent acts in such a manner as to hold the plaster in a more colloidal and plastic state against the surface of the wax model. This means that when the wax is burned out, the plaster exposed to the gold is itself smooth and free from air voids, pin holes, etc., so that the gold casting against it will attain to a like degree of smoothness. Other materials, such as fine colloidal clays, may be substituted for the two plasticizing agents mentioned above, but I have found that andalusite and rotten stone give the best results. Retarder or accelerator well known to the trade, may be used to regulate the set of the resulting composition with water. Common accelerators known to the art are finely ground gypsum, potassium sulphate, alum, etc. Commonly used retarders are hydrolized protein matter, known as "commercial retarder" and such chemicals as soluble citrates, phosphates and acetates. Powdered flint, quartz or other siliceous fillers may be used instead of the powdered silica.

My improved molding composition in a simple form will therefore consist of the following ingredients in approximately the proportions named:

| | Per cent |
|---|---|
| Finely ground silica | 60–80 |
| Alpha gypsum | 20–40 |
| Retarder or accelerator to regulate set as desired. | |
| Water about 30 cc's. per 100 grams of dry mix. | |

In its more complete form, my composition will have approximately the following formula:

| | Grams |
|---|---|
| Finely ground silica (graded from 200–400 mesh) | 65 |
| Alpha gypsum (ball milled about three hours) | 30 |
| Andalustie, (finely ground) | 5 |
| Boric acid | 2 |
| Alundum | 1 |

These formulas will produce very excellent results and exceptionally fine castings are obtained which are absolutely true to dimensions, and which possess a fine, smooth surface of the type desired.

I would state in conclusion that while the above examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. A molding composition a mixture of the following ingredients:

| | Per cent |
|---|---|
| Finely ground silica | 60–80 |
| Alpha gypsum | 20–40 |
| Retarder to regulate the set with water. | |

2. A dental molding composition comprising alpha gypsum and finely powdered silica.

3. A dental composition comprising alpha gypsum, and a siliceous filling material in major proportion.

4. A composition of matter comprising approximately 70 per cent finely ground silica and 30 per cent alpha gypsum, together with an agent adapted to modify the setting time of the composition with water.

5. A composition of matter comprising finely ground silica, alpha gypsum, and a plasticizing agent.

6. A molding composition comprising alpha gypsum, finely ground silica, andalusite, boric acid, and alundum.

7. A composition of matter comprising finely ground silica, ball milled alpha gypsum, and a plasticizing agent.

8. A composition of matter having approximately the following composition:

| | Grams |
|---|---|
| Silica 200–400 mesh | 65 |
| Alpha gypsum, (ball milled about three hours) | 30 |
| Andalusite, finely ground | 5 |
| Boric acid | 2 |
| Alundum | 1 |

9. A dental molding composition comprising alpha gypsum and finely ground silica to produce a casting, when set with water, having a thermal expansion ranging from 0.8 to 0.9%.

10. A dental molding composition comprising alpha gypsum ball milled for about three hours, finely ground silica and a plasticizing agent.

11. A composition of matter comprising alpha gypsum, finely ground silica and colloidal clay.

12. A composition of matter suitable for dental molding purposes, which comprises alpha gypsum, finely ground silica, and a plasticizing agent such as rotten stone.

13. A dental molding composition comprising finely ground calcined gypsum, finely ground silica and rotten stone.

14. A composition of matter comprising alpha gypsum, and a siliceous filling material.

MANVEL C. DAILEY.